(12) United States Patent
Harwood

(10) Patent No.: US 11,497,181 B2
(45) Date of Patent: Nov. 15, 2022

(54) APPARATUS AND METHOD TO FORM AND MOUNT PANS

(71) Applicant: Just Greens, LLC, Newark, NJ (US)

(72) Inventor: Edward D. Harwood, Ithaca, NY (US)

(73) Assignee: Just Greens, LLC, Newark, NJ (US)

( * ) Notice: Subject to any disclaimer, the term of this patent is extended or adjusted under 35 U.S.C. 154(b) by 217 days.

(21) Appl. No.: 16/759,691

(22) PCT Filed: Oct. 31, 2018

(86) PCT No.: PCT/US2018/058516
§ 371 (c)(1),
(2) Date: Apr. 27, 2020

(87) PCT Pub. No.: WO2019/089800
PCT Pub. Date: May 9, 2019

(65) Prior Publication Data
US 2020/0337258 A1    Oct. 29, 2020

Related U.S. Application Data

(60) Provisional application No. 62/580,239, filed on Nov. 1, 2017.

(51) Int. Cl.
*A01G 31/06* (2006.01)
*A47B 81/00* (2006.01)
*A47B 47/00* (2006.01)
*A01G 31/00* (2018.01)

(52) U.S. Cl.
CPC .......... *A01G 31/06* (2013.01); *A47B 47/0083* (2013.01); *A47B 81/00* (2013.01); *A01G 2031/006* (2013.01)

(58) Field of Classification Search
CPC .............. A01G 31/06; A01G 2031/006; A47B 47/0083; A47B 81/00; Y02P 60/21
See application file for complete search history.

(56) References Cited

U.S. PATENT DOCUMENTS 1,890,042 A * 12/1932 Morandi ................... B25B 1/08
                                                     269/166
2,203,162 A *  6/1940 Lee ........................... B23C 7/00
                                                     451/365
(Continued)

FOREIGN PATENT DOCUMENTS

CN    203063104 U    7/2013
WO    2015115433 A1   8/2015

OTHER PUBLICATIONS

International Search Report and Written Opinion from related International Patent Application No. PCT/US2018/058516 dated Feb. 6, 2019.

*Primary Examiner* — Stanton L Krycinski
(74) *Attorney, Agent, or Firm* — McCarter & English, LLP; John Pillion

(57) ABSTRACT

The present disclosure provides an advantageous pan jig for installing a pan relative to a frame. The disclosed pan jig semi-permanently engages the pan relative to a frame. Specifically, the disclosed apparatus and method of use advantageously facilitates formation and mounting of a drip pan for use with a system that facilitates aeroponic growing. The disclosed aeroponic growing system may include a plurality of drip pans.

19 Claims, 15 Drawing Sheets

(56) References Cited

U.S. PATENT DOCUMENTS

| | | | |
|---|---|---|---|
| 2,311,042 A * | 2/1943 | Ferguson | B25B 5/003 |
| | | | 269/297 |
| 2,503,560 A | 4/1950 | Moyer | |
| 3,105,239 A | 10/1963 | Bergstrom | |
| 3,184,210 A | 5/1965 | Charles et al. | |
| 3,335,530 A | 8/1967 | Hurd | |
| 3,601,947 A | 8/1971 | Hurd | |
| 3,852,387 A | 12/1974 | Bortnick et al. | |
| 3,861,847 A | 1/1975 | Barnett | |
| 4,156,588 A | 5/1979 | Miller et al. | |
| 4,445,677 A | 5/1984 | Hansen et al. | |
| 4,531,666 A | 7/1985 | Fuller et al. | |
| 4,556,207 A | 12/1985 | Thompson et al. | |
| 4,571,897 A | 2/1986 | Kerr | |
| 4,946,430 A | 8/1990 | Kohmann | |
| 5,125,825 A | 6/1992 | Janosco | |
| 5,251,412 A | 10/1993 | de Almeida Borges | |
| 5,290,166 A | 3/1994 | Heatherly | |
| 5,904,348 A * | 5/1999 | Sevy | B25B 5/12 |
| | | | 269/236 |
| 6,056,840 A | 5/2000 | Mills et al. | |
| 6,325,366 B1 * | 12/2001 | Kane | B23K 37/0533 |
| | | | 269/902 |
| 6,523,818 B1 * | 2/2003 | Le Vert | B25B 5/147 |
| | | | 269/41 |
| 7,861,982 B1 * | 1/2011 | McClure | E21B 17/1035 |
| | | | 285/364 |
| 8,096,514 B1 * | 1/2012 | Stocker | A47G 19/08 |
| | | | 248/346.07 |
| 8,533,992 B2 | 9/2013 | Harwood | |
| 9,146,003 B2 * | 9/2015 | Carson | F16M 13/02 |
| 2009/0026679 A1 * | 1/2009 | Harman, III | F41C 27/00 |
| | | | 269/74 |
| 2015/0001778 A1 * | 1/2015 | Barnes | B25B 11/00 |
| | | | 269/81 |

* cited by examiner

APPARATUS AND METHOD TO FORM AND MOUNT PANS

CROSS-REFERENCE TO RELATED APPLICATION

The present application claims priority benefit to a provisional patent application entitled "Apparatus and Method to Form and Mount Pans," which was filed on Nov. 1, 2017, and assigned Ser. No. 62/580,239. The content of the foregoing provisional application is incorporated herein by reference.

BACKGROUND

Technical Field

The disclosed apparatus and method of use advantageously facilitates formation and mounting of a pan for use with a system that facilitates aeroponic growing. The disclosed apparatus and method may be utilized in other applications that require and/or benefit from in situ formation and mounting of structures that share features and/or functions akin to the disclosed pan, e.g., feed troughs, sluices and/or tubs for various commercial use (with or without end caps).

Background Art

Traditional indoor plant growing systems may maximize space by including multiple levels for support of plant growth. Each level may include a trough or drip pan that functions to capture nutrient fluid/solution that drips from a growing surface (e.g., cloth/fabric substrate) and/or from the plant roots. The trough or drip pan may further facilitate removal and/or recirculation of the captured nutrient fluid/solution.

In view of the dimensional requirements of large-scale plant growing systems, challenges exist in assembling and positioning drip pans relative to other components of the system. For example, attempts to connect/combine modular drip pans in an end-to-end fashion so as to satisfy length requirements of the growing system have proven difficult, expensive and unreliable, e.g., based on the need to establish reliable seam connections. Indeed, seam connections established between modular drip pan components have been prone to leaking which can cause damage and undesirable loss of water and nutrient.

The apparatus and method(s) disclosed herein advantageously address the noted shortcomings of drip pan assembly and positioning for plant growing systems of the type disclosed in the '992 patent. In addition, the disclosed apparatus and method(s) have broad applicability in forming alternative structures, e.g., feed troughs, sluices and tubs for various commercial or industrial uses (with or without end caps).

SUMMARY

The present disclosure provides advantageous pan mounting apparatuses and methods. The disclosed apparatuses/methods may be applied in a range of applications to form and mount desired structures, e.g., vertical plant growing systems, feed troughs, sluices and tubs for various commercial and/or industrial applications.

A plant growing system is described in U.S. Pat. No. 8,533,992. The system disclosed in the '992 patent is generally housed within a building and uses artificial techniques for providing light and a sprayed nutrient solution for optimal plant growth. The system disclosed in the '992 patent includes, inter alia, a frame (e.g., an "AGL frame") that functions to support operational aspects of the system, e.g., a source of artificial light, a source of nutrient solution, and a cloth or fabric substrate upon which plants germinate and grow. The content of the '992 patent is incorporated herein by reference.

A building may hold many plant growing systems and each plant growing system may include multiple, horizontally-spaced levels for support of plant growth. In embodiments of the noted plant growing system, each level includes a trough or drip pan that functions to capture nutrient fluid/solution that drips from the cloth/fabric substrate and/or the plant roots, and to facilitate removal and/or recirculation of the captured nutrient fluid/solution. Recirculation of the nutrient fluid/solution advantageously conserves water and nutrients.

The disclosed apparatus/method may provide easy transport, simple formation, concise fabrication, fewer parts, and reduced or no seams. For instance, embodiments of the disclosed apparatus/method may utilize a continuous pan sheet (e.g., a drip pan sheet) of requisite length. The disclosed continuous drip pan sheet reduces labor, part count, and eliminates the potential for leakage. The disclosed drip pan sheet may be utilized within a system that facilitates aeroponic growing. To facilitate easy installation, a pan jig (e.g., a drip pan jig) may be utilized to engage with a frame structure (an "AGL frame") and the disclosed continuous drip pan sheet. The disclosed drip pan jig may be designed to semi-permanently engage the drip pan sheet with the AGL frame. The AGL frame may include a plurality of vertical members, cross members, side members and frame brackets. The AGL frame may further include a plurality of drip pan rails that may at least partially engage with the disclosed drip pan sheet. The disclosed drip pan jig may ensure consistent construction (e.g., bolt placement) of the drip pan sheet, drip pan rail and at least one vertical member.

In some embodiments, a drip pan may be formed and mounted relative to an AGL frame for use in vertical growing systems by unfurling the drip pan at least in part within the AGL frame, wherein the unfurled drip pan defines a concave shape and extends at least partially the length of the AGL frame; mounting a frame bracket to the AGL frame, wherein the frame bracket is configured and dimensioned to receive at least a portion of the unfurled drip pan; mounting a clamp bracket relative to the frame bracket, wherein the clamp bracket includes a cam assembly which is configured and dimensioned to receive a drip pan rail; positioning a drip pan rail relative to the cam assembly, wherein the drip pan rail is simultaneously in contact with the drip pan; semi-permanently locking the clamp bracket, the drip pan rail and the unfurled drip pan relative to the frame bracket; fastening the drip pan rail and the unfurled drip pan to the AGL frame; and removing the clamp bracket and the frame bracket, wherein upon removal of the clamp bracket and the frame bracket, the unfurled drip pan and the drip pan rail remain fastened relative to the AGL frame.

As used throughout, drip pan and drip pan sheet may be used interchangeably without departing from the spirit/scope of this disclosure.

Additional features, functions and benefits of the disclosed apparatus and methods will be apparent from the description which follows, particularly when read in conjunction with the appended figures.

BRIEF DESCRIPTION OF DRAWINGS

Features and aspects of embodiments are described below with reference to the accompanying drawings, in which elements are not necessarily depicted to scale.

Embodiments of the present disclosure are further described with reference to the appended figures. It is to be noted that the various features, steps and combinations of features/steps described below and illustrated in the figures can be arranged and organized differently to result in embodiments which are still within the scope of the present disclosure.

Figure 1A:
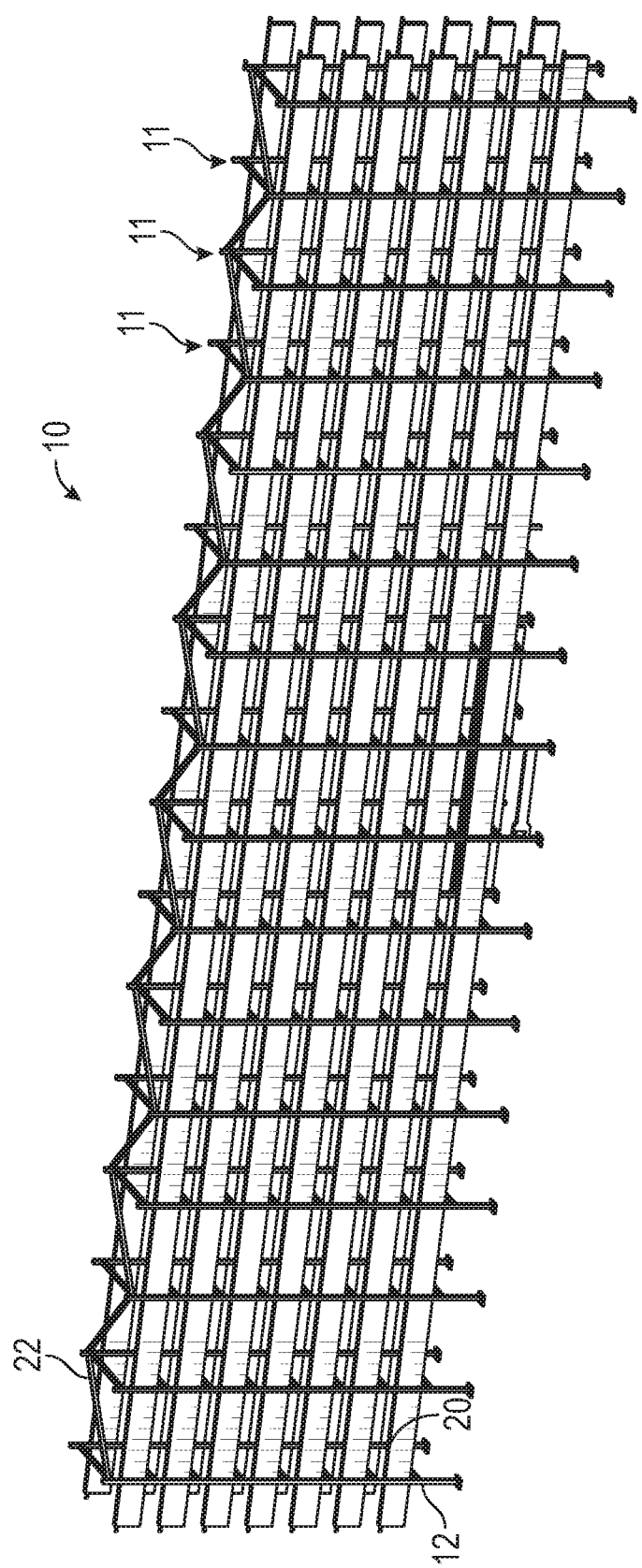
Figure 1B:
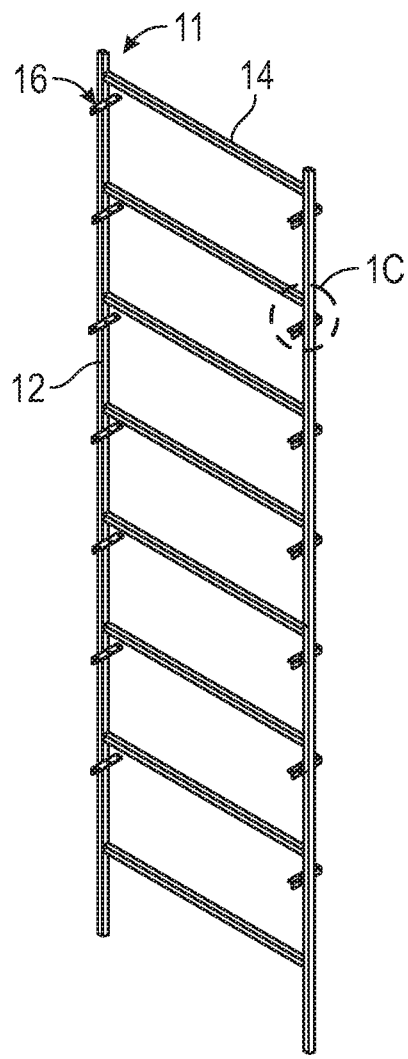
Figure 1C:
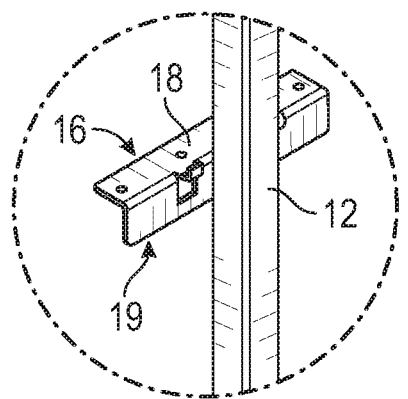
Figure 2:
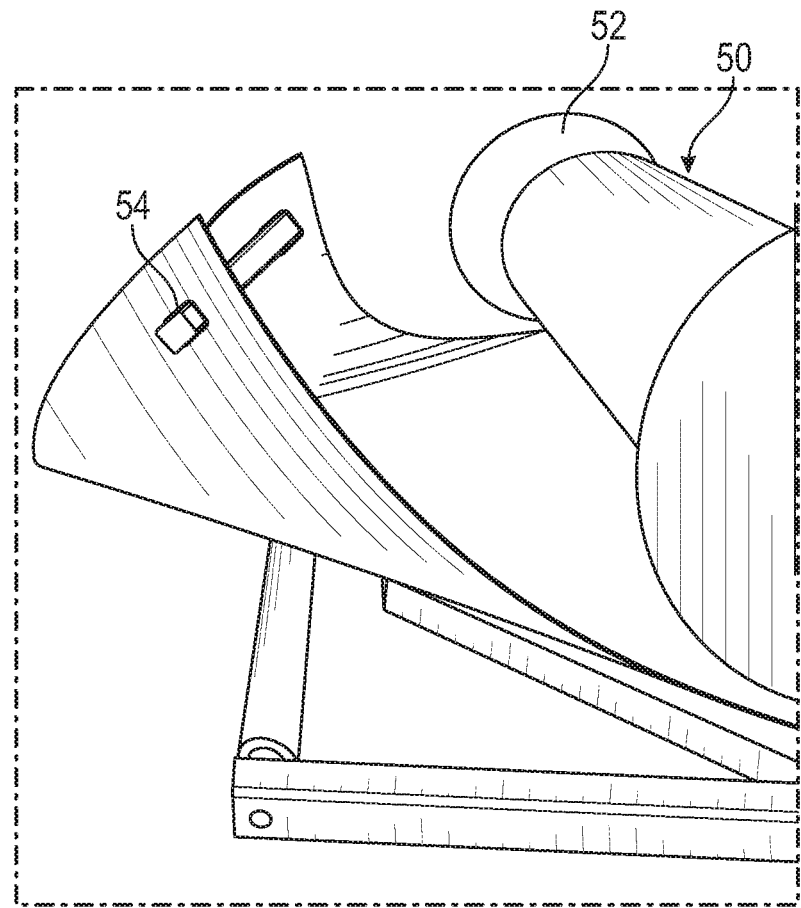
Figure 3:
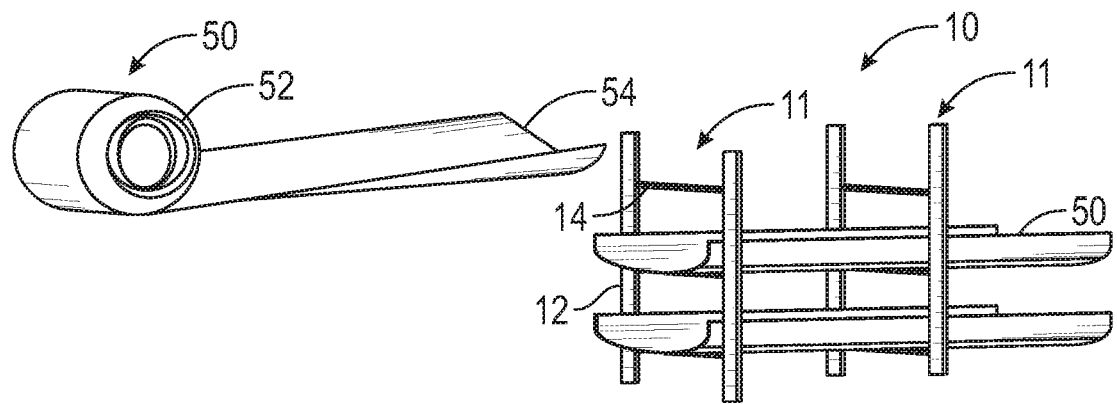
Figure 4A:
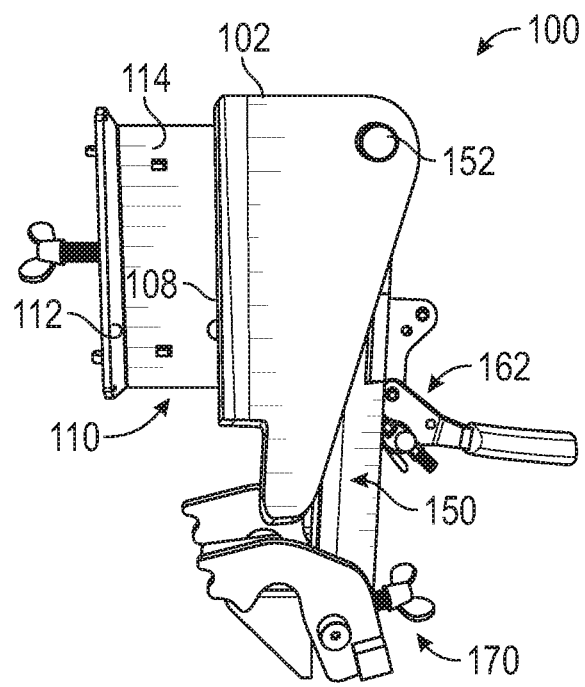
Figure 4B:
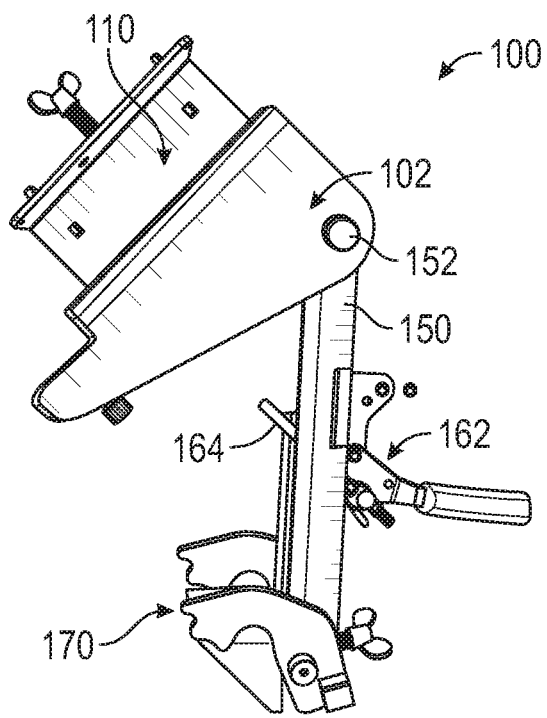
Figure 4C:
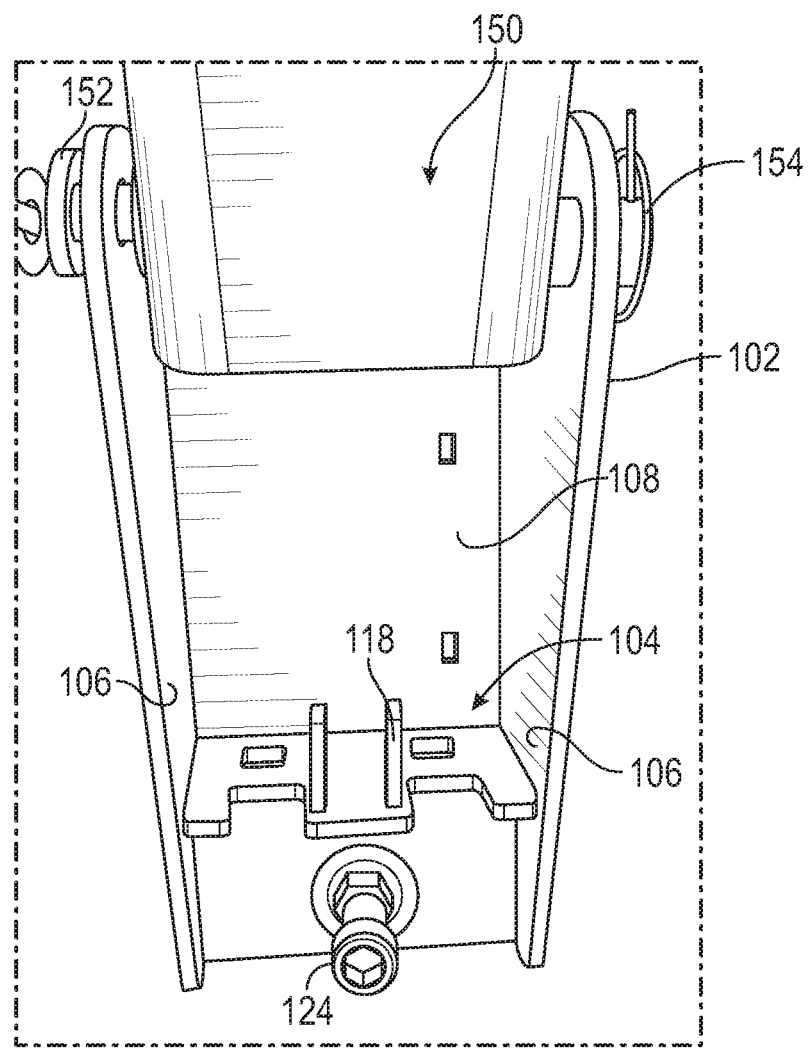
Figure 5A:
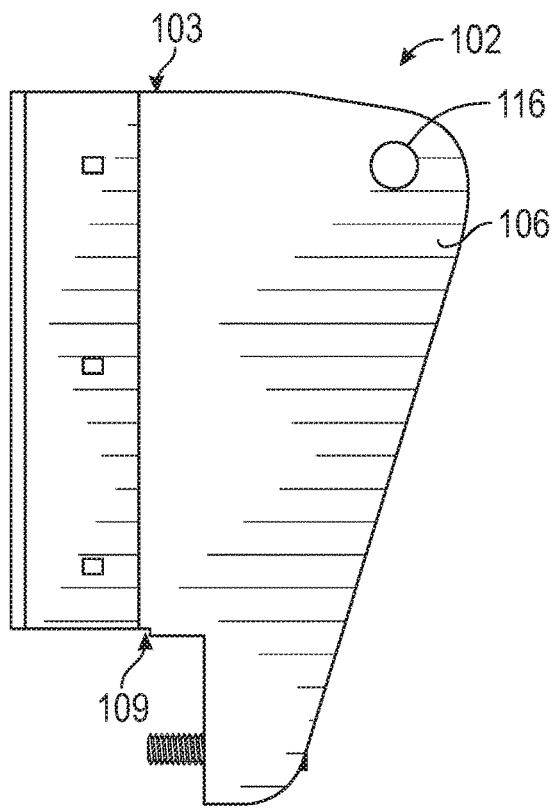
Figure 5B:
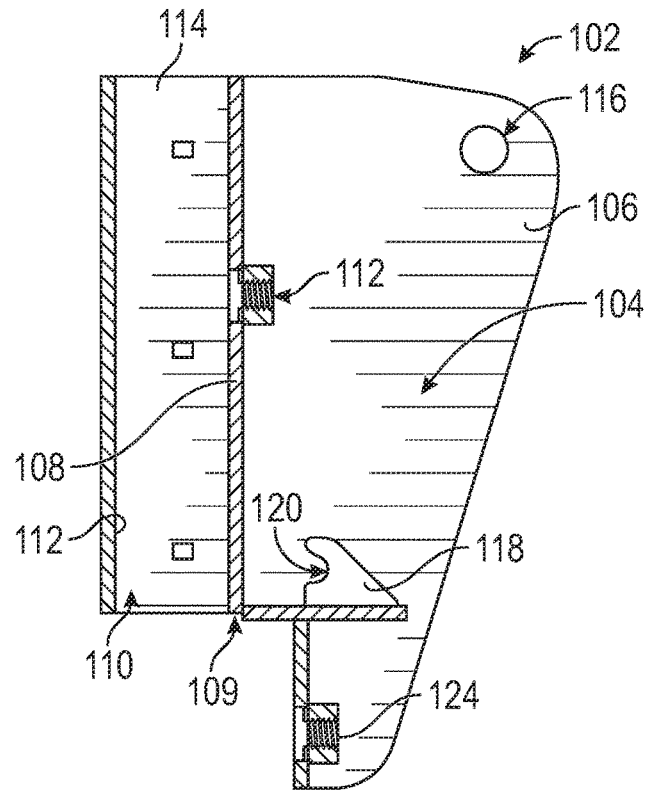
Figure 6A:
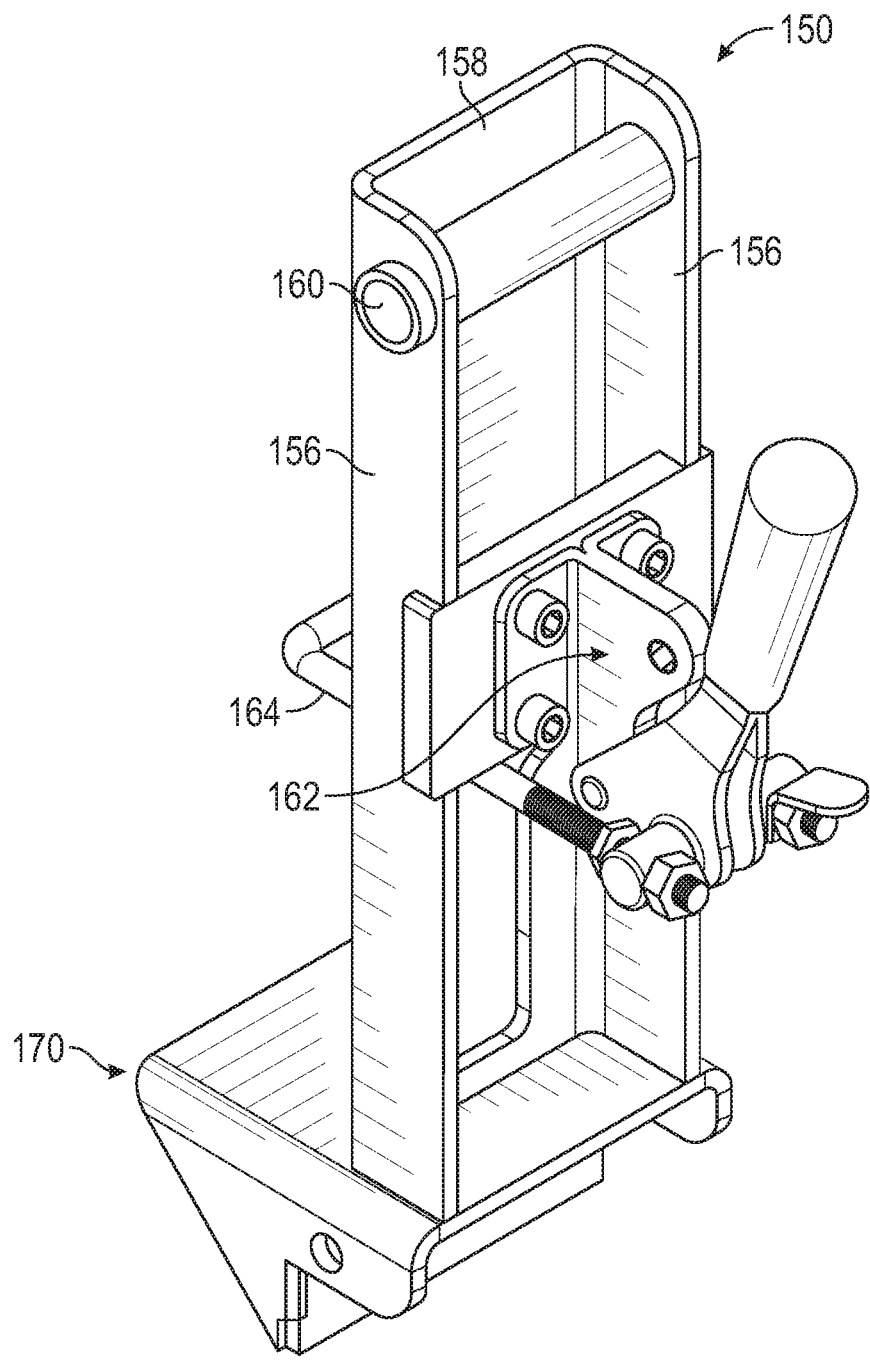
Figure 6B:
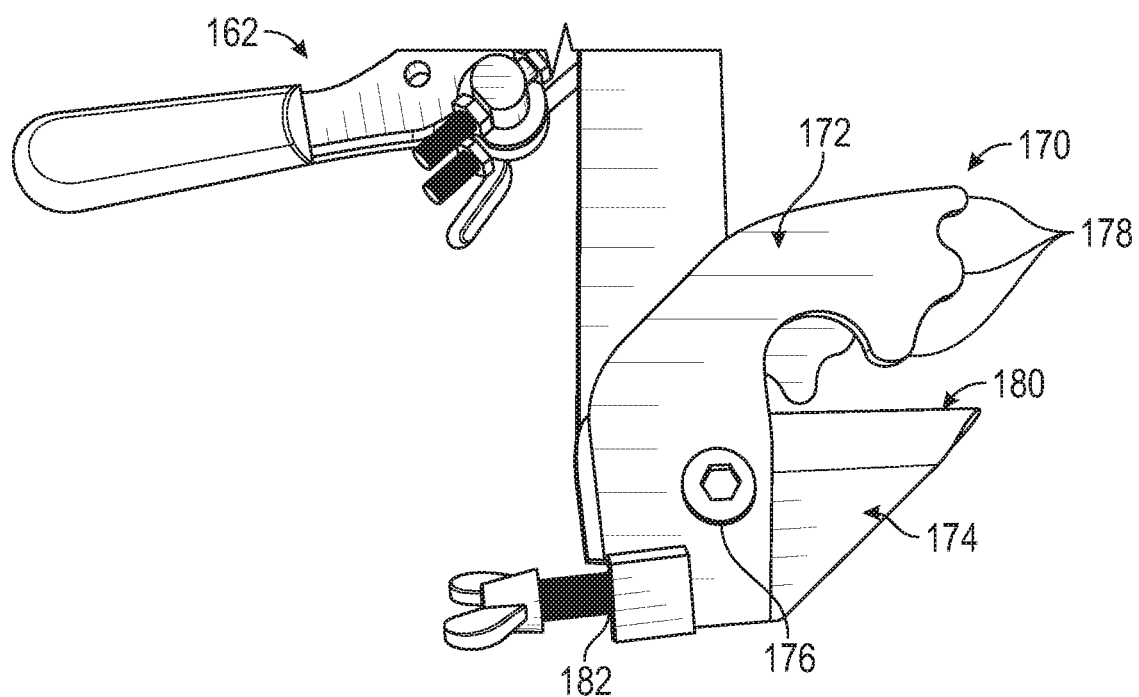
Figure 8:
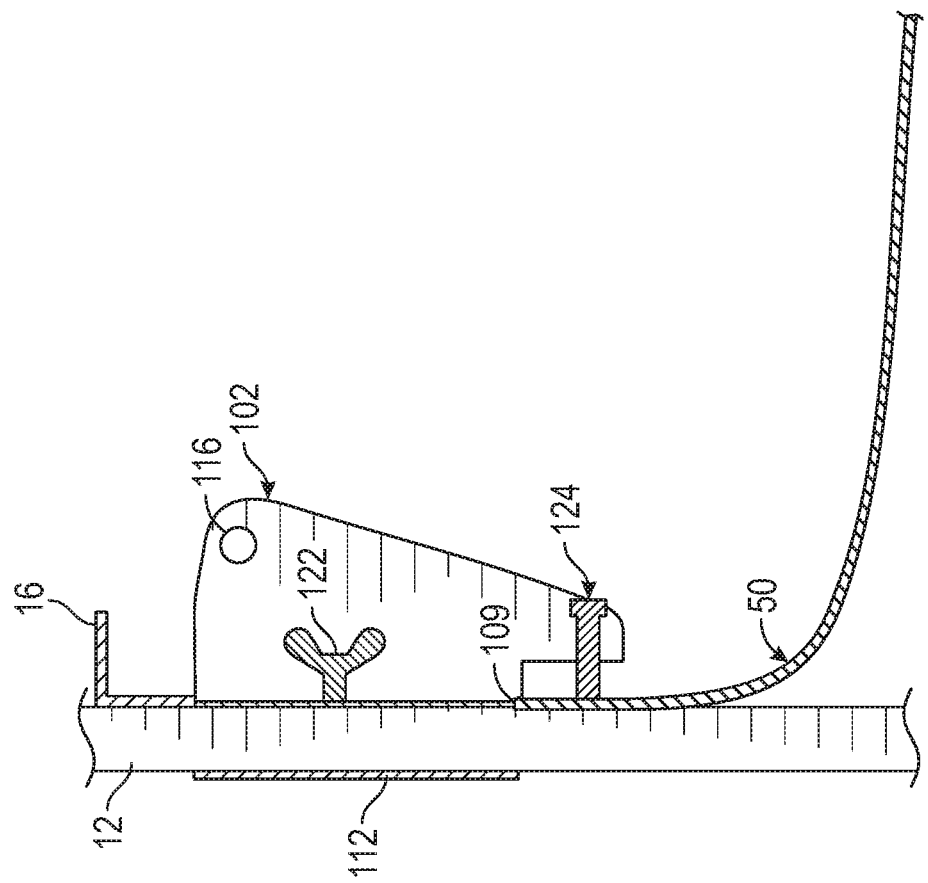
Figure 7:
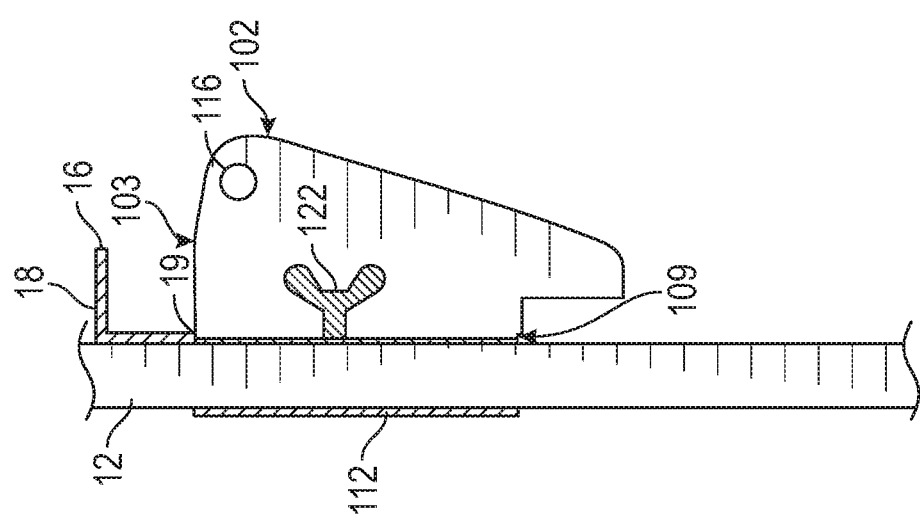
Figure 9:
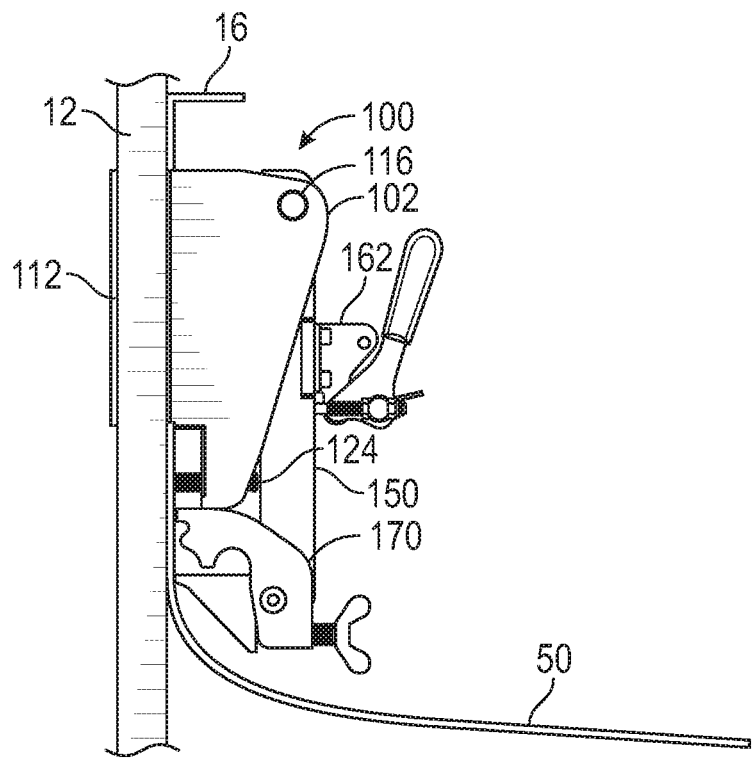
Figure 10A:
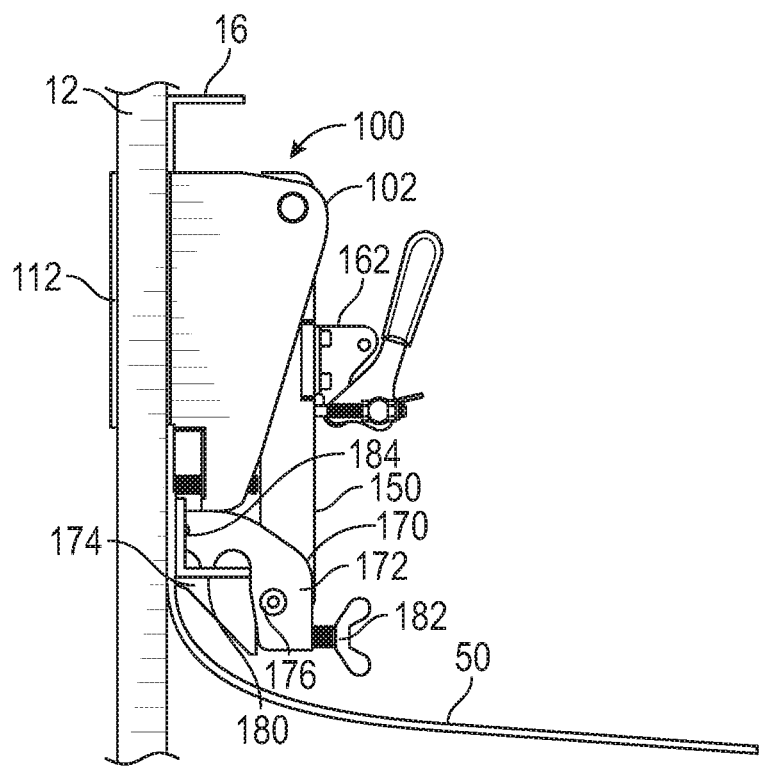
Figure 10B:
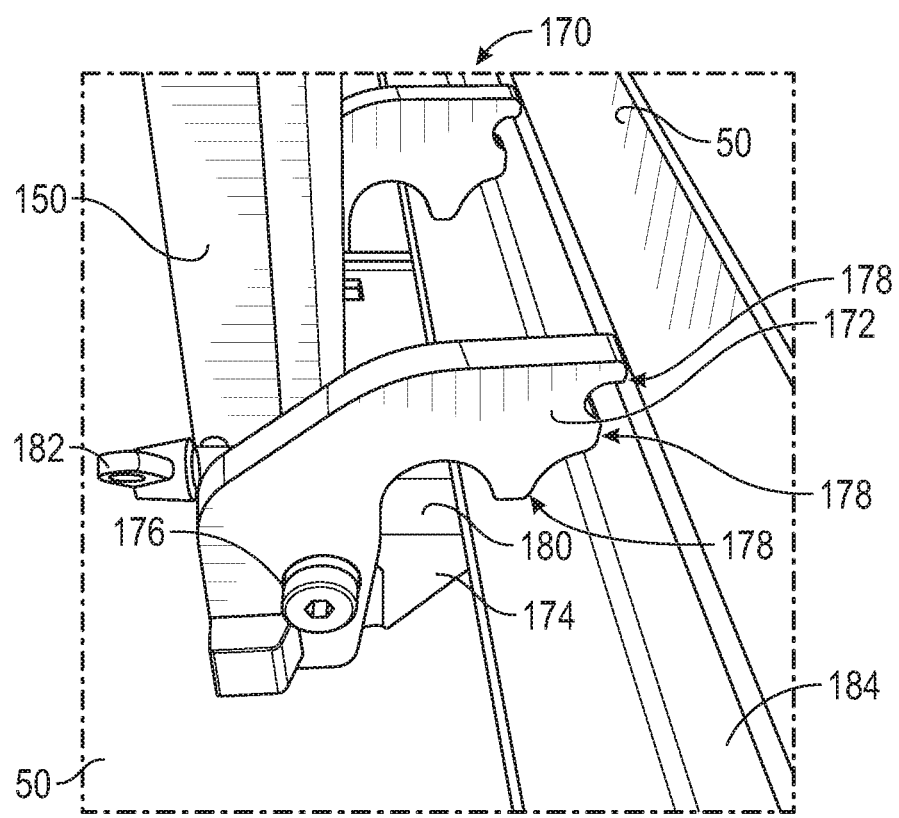
Figure 11A:
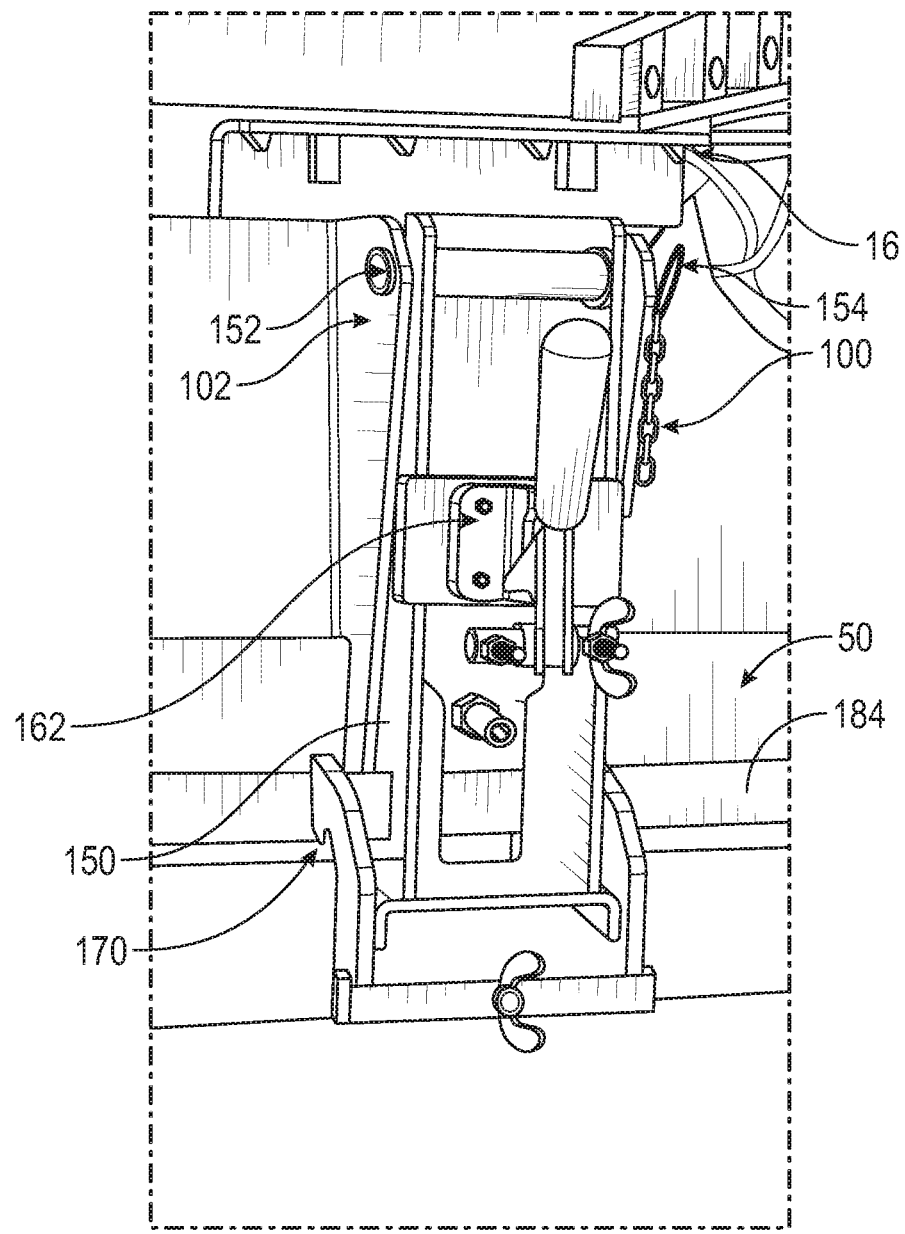
Figure 11B:
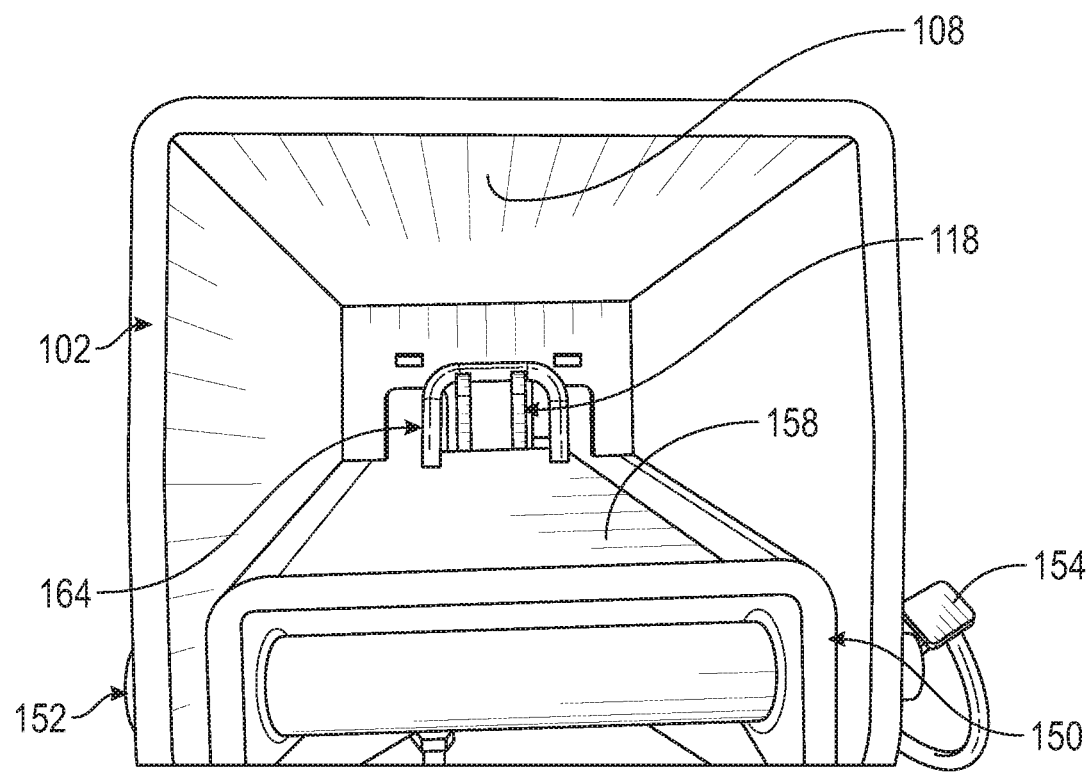
Figure 12:
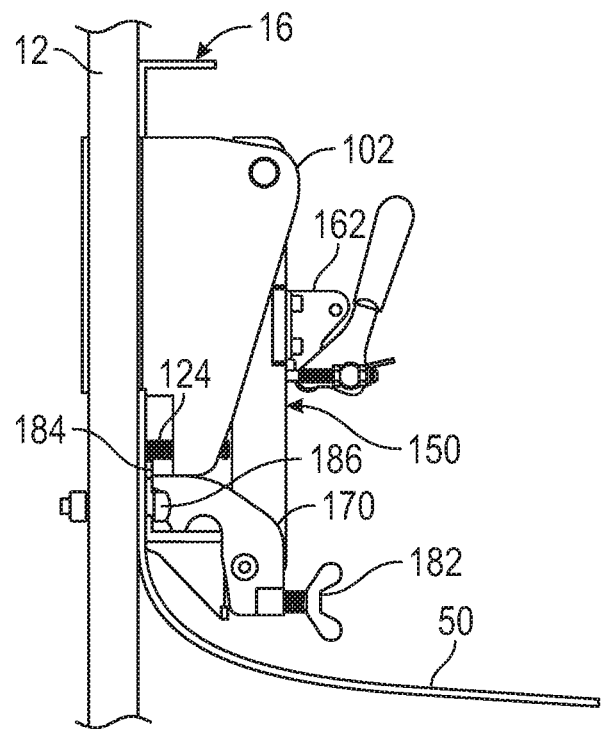
Figure 13:
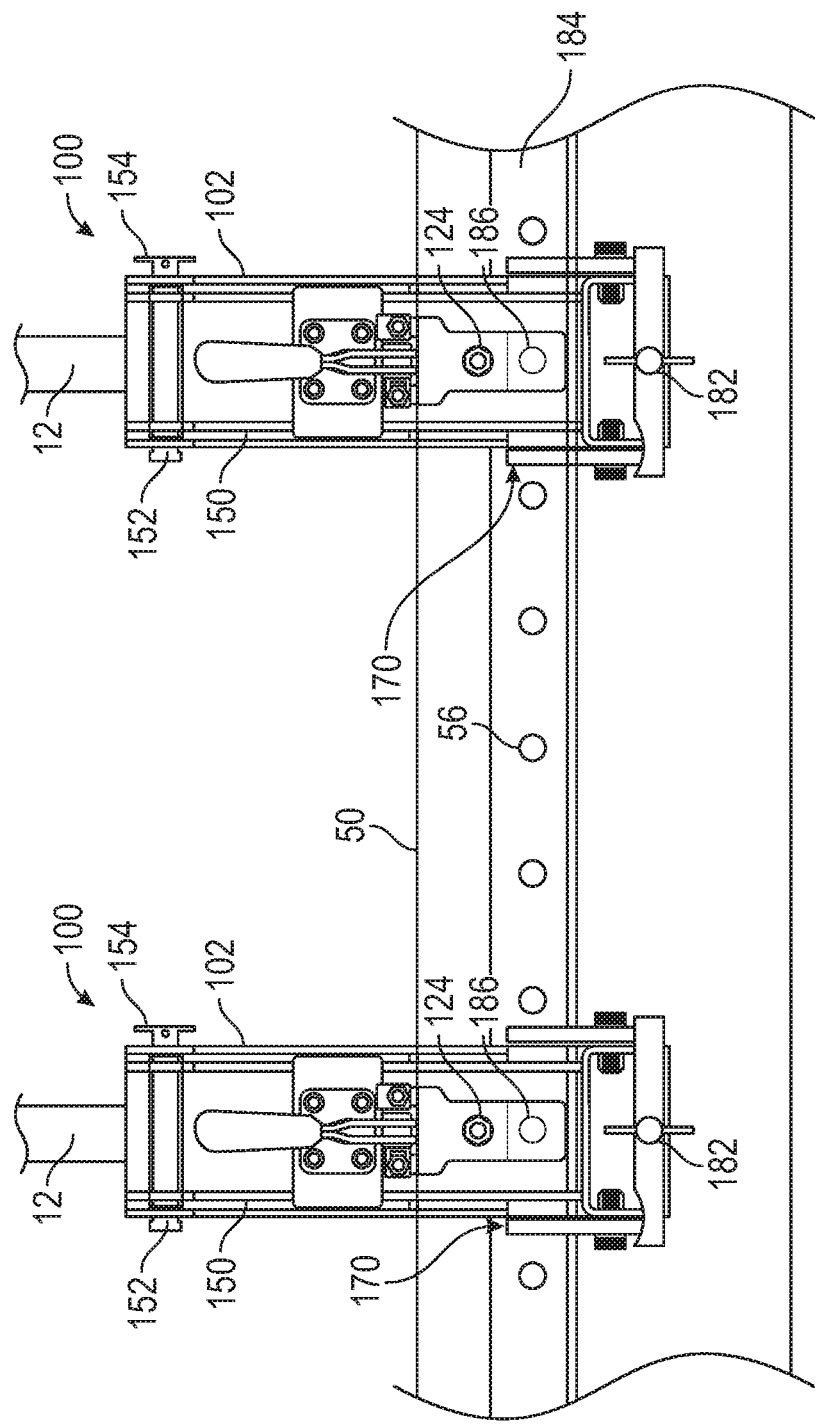
Figure 14:
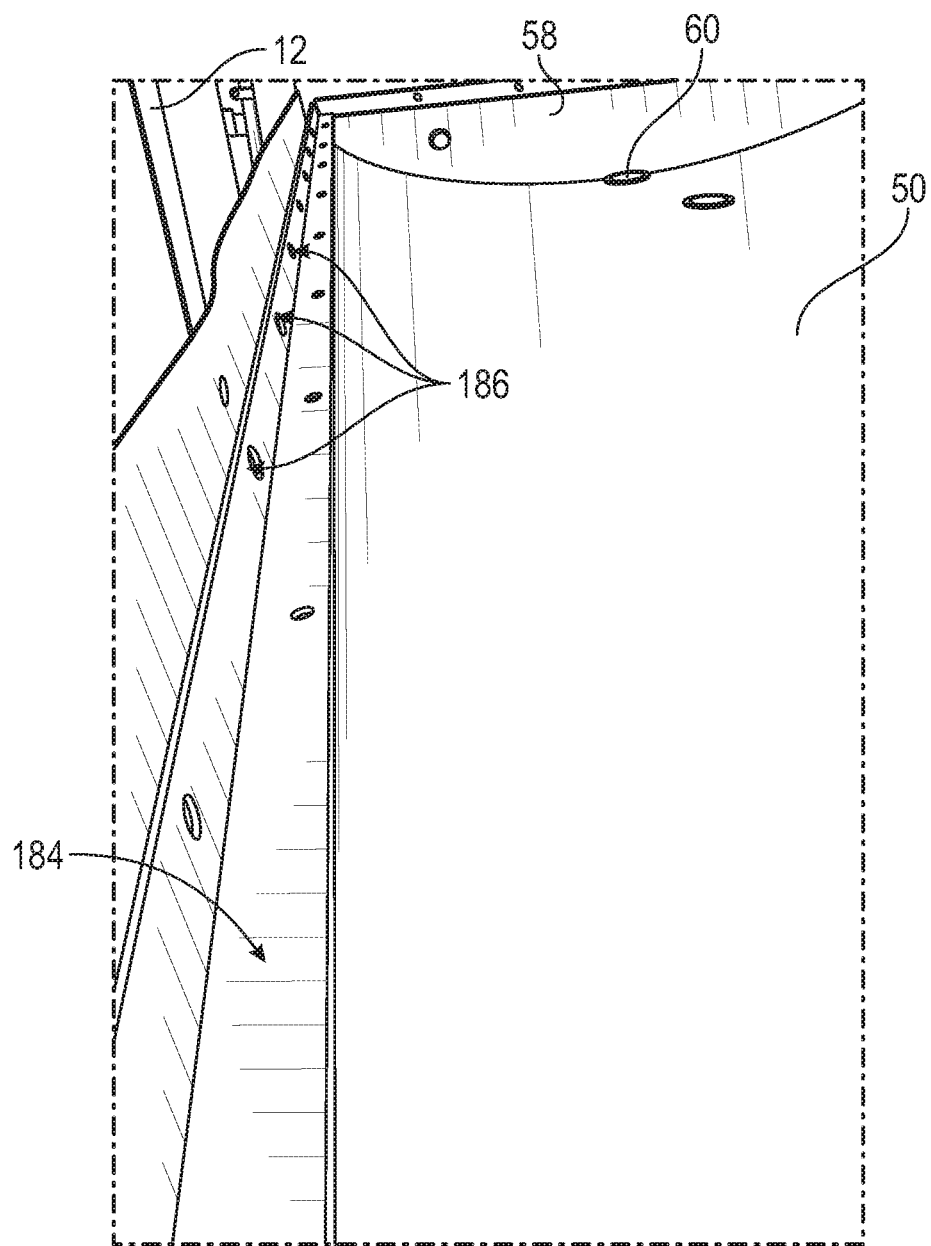

To assist those of ordinary skill in the art in making and using the disclosed assemblies, systems and methods, reference is made to the appended figures, wherein:

FIGS. 1A-1C schematically depict an AGL frame according to the present disclosure;

FIG. 2 schematically depicts a drip pan according to the present disclosure;

FIG. 3 schematically depicts a drip pan positioned relative to an AGL frame according to the present disclosure;

FIGS. 4A-4C schematically depict an assembled drip pan jig according to the present disclosure;

FIG. 5A schematically depicts a side view of a frame bracket and FIG. 5B schematically depicts a cross-sectional view of the frame bracket, according to the present disclosure;

FIG. 6A schematically depicts a perspective view of a clamp bracket and FIG. 6B schematically depicts a side view of a cam assembly from the clamp bracket, according to the present disclosure;

FIG. 7 schematically depicts a cross-sectional view of the frame bracket according to the present disclosure;

FIG. 8 schematically depicts a side view of the assembled frame bracket and drip pan according to the present disclosure;

FIG. 9 schematically depicts a side view of the assembled drip pan jig and drip pan according to the present disclosure;

FIG. 10A schematically depicts a side view of the assembled drip pan jig, drip pan and drip pan rail and FIG. 10B schematically depicts a side view of the cam assembly and the drip pan rail, according to the present disclosure;

FIG. 11A schematically depicts a front view of the assembled drip pan jig, drip pan and drip pan rail and FIG. 11B schematically depicts a top view of a U-bar and hook assembly, according to the present disclosure;

FIG. 12 schematically depicts a side view of the assembled drip pan jig, drip pan and drip pan rail according to the present disclosure;

FIG. 13 schematically depicts a front view of two drip pan jigs assembled with the drip pan and drip pan rail according to the present disclosure; and FIG. 14 schematically depicts a front view of the assembled drip pan and drip pan rail.

DETAILED DESCRIPTION OF DISCLOSURE

The present disclosure relates to an apparatus and method to form and mount a pan (e.g., a drip pan). More particularly, an apparatus and method to form and mount a continuous drip pan for use in vertical growing systems (e.g., vertical aeroponic growing) is provided. The disclosed vertical growing system may utilize a plurality of continuous drip pans. It should be understood, however, that the disclosed embodiments may be embodied in various forms. Therefore, details disclosed herein with reference to the disclosed apparatuses/methods are not to be interpreted as limiting, but merely as the basis for teaching one skilled in the art how to make and use the advantageous apparatuses/methods (e.g., a drip pan jig and a drip pan sheet) and/or alternative assemblies of the present disclosure.

The disclosed drip pan may be configured individually or in combination with at least one other component (e.g., a growing tray). The disclosed drip pan may be configured to contain a fluid. More particularly, the disclosed drip pan may be configured to capture a fluid. The fluid positioned within the disclosed drip pan may be directed to secondary location (e.g., a reservoir). The disclosed drip pan may be positioned relative to a frame structure ("AGL frame"). Although this embodiment focuses on directing and holding fluids, the technology is not limited to such and can be utilized with a variety of fluids and materials.

Referring now to the drawings, like parts are marked throughout the specification and drawings with the same reference numerals, respectively. Drawing figures are not necessarily to scale and in certain views, parts may have been exaggerated for purposes of clarity.

AGL Frame

As shown in FIGS. 1A-1B, AGL frame 10 may include a plurality of vertical members 12 and a plurality of cross members 14. Cross members 14 may be positioned relative to vertical members 12. For example, cross members 14 may be configured to interface with at least two opposing vertical members 12. Cross members 14 may be positioned substantially perpendicular to vertical member 12. Cross members 14 may be positioned relative to the at least two vertical members 12 to ensure vertical members 12 are substantially perpendicular to a mounting surface (e.g., a floor). Vertical members and/or cross members 14 may have a square cross-section.

As shown in FIG. 1C, AGL frame 10 may further include at least one bracket (e.g., LED rail mounting bracket) 16 positioned relative to vertical member 12. LED rail mounting bracket 16 may be positioned substantially perpendicular to vertical member 12. At least one LED rail mounting bracket 16 may be positioned in close proximity to cross member 14. LED rail mounting bracket 16 may be an angle bracket (e.g., a 90 degree angle bracket). Side members 20 which may be positioned relative to LED rail mounting bracket 16. Optional side member 20 may interface with LED rail mounting bracket 16 on surface 18. Side members 20 may be configured to interface with at least two adjacent LED rail mounting brackets 16. Side members 20 may interface with a plurality of adjacent LED rail mounting brackets 16. Similar to cross members 14, side members 20 may ensure vertical members 12 are substantially perpendicular to a mounting surface (e.g., a floor). AGL frame 10 may further include diagonal member 22 positioned relative to vertical member 12. Diagonal member 22 may be configured to interface with at least two diagonally-positioned vertical members 12.

In one embodiment, AGL frame 10 may include a plurality of AGL frame sets 11 positioned adjacent to each other. For example, AGL frame 10 may include first set 11 including two vertical members 12 positioned in opposition at a predetermined distance and connected by at least one cross member 14. Each vertical member 12 may include at least one LED rail mounting bracket 16 positioned thereon, as discussed above. Second set 11 may further include two vertical members 12 positioned in opposition at a predetermined distance and connected by at least one cross member 14. Each vertical member 12 may include at least one LED rail mounting bracket 16 positioned thereon, as discussed above. First set 11 and second set 11 may be adjacently positioned relative to each other such that cross members 14 are substantially parallel. At least one side member 20 may optionally be present and may be positioned relative to LED rail mounting bracket 16. Particularly, side member 20 may engage vertical member 12 of first set 11 with adjacent vertical member 12 of second set 11. Diagonal member 22 may further engage vertical member 12 of first set 11 with diagonally-positioned vertical member 12 of second set 11.

AGL frame 10 may further include additional AGL frame sets 11, as discussed above, which may be adjacently positioned relative to first and second AGL frame sets 11. AGL frame 10 may include at least two AGL frame sets 11 and at least one drip pan, as will be discussed in more detail below. More particularly, at least one continuous drip pan may be positioned relative to the at least two AGL frame sets 11. (e.g., relative to each cross member 14). In some instances, AGL frame 10 may extend approximately 10-40 meters in length and may include about 5-20 drip pan levels. In such instance, AGL frame 10 may include a plurality of AGL frame sets 11 (e.g., 16 AGL frame sets), wherein each set 11 includes at least 2 vertical members, at least 5 cross-members and at least 10 LED rail mounting brackets 16. However, the number of required components is at least partially dependent on the number of drip pan levels.

Drip Pan Installation

As mentioned above, at least one drip pan may be positioned relative to AGL frame 10. As depicted in FIG. 3, at least one continuous drip pan 50 may be positioned relative to AGL frame 10. In one embodiment, drip pan sheet 50, positioned on roll 52 (See FIG. 2), may be unfurled within AGL frame 10 to form a continuous drip pan 50, which extends at least partially the length of AGL frame 10. As shown in FIG. 3, drip pan 50 may be positioned in close proximity to vertical members 12 and cross members 14. Drip pan 50 may be stretched thoroughly to avoid long term resting on cross members 14. Such long term resting may irreversibly deform drip pan 50, which may impact the flowability of fluids. In such case, as will be discussed in more detail below, drip pan 50 may be suspended above at least one cross member 14. Drip pan 50 is generally installed at or near ambient temperature to ensure retention of desired shape.

Depending on the length of AGL frame 10, bar 54 may interface with the exposed end of drip pan 50 for ease of unfurling. For example, bar 54 may be inserted into holes located at the exposed end of drip pan 50. Bar 54 may be manually pulled, mechanically pulled (e.g., a winch), or a combination thereof. As drip pan 50 is being unfurled, ensure formed drip pan 50 is positioned uniformly to avoid deformities, especially those that may cause puddling. The ends of drip pan 50 may be cut to the desired length, which may be the full length of AGL frame 10. If desired, drip pan 50 may be angled so as to direct a fluid to one end where a drain is positioned. The disclosed drain may further direct the fluid to a reservoir for recirculation. Additionally, a barrier (e.g., a cap) may be positioned and fluidly sealed in close proximity to at least one end of drip pan 50. The cap may facilitate fluid flow down a closely positioned drain or, if no drain/drain is closed, the cap enables drip pan 50 to act as a holding chamber. As depicted in FIG. 3, excess drip pan material may be curled up at least partially against vertical members 12 to form sidewalls and to facilitate mounting, discussed in more detail below. Drip pan 50 may defined as having a cross-section that is concave in shape.

In one embodiment, drip pan 50 may be fabricated at least partially from a plastic material. Plastic provides sufficient chemical resistance, ease of cleaning, and the ability to be formed. However, additional materials may be utilized without departing from the spirit/scope of this disclosure. For example, drip pan 50 may be fabricated from sheet metal or canvas. Drip pan 50 may be fabricated from a combination of plastic, sheet metal, or canvas. In the event a material is chosen with suboptimal chemical resistance, resistant coatings may be applied. As mentioned above, the length of drip pan 50 may at least partially depend on the length of AGL frame 10 and whether drip pan 50 is intended to partially or fully extend the length of AGL frame 10. The width of drip pan 50 is at least partially a function of the desired final depth and width of drip pan 50. The width of drip pan 50 accounts for the material expended for mounting to AGL frame 10. Each level of AGL frame 10 is may be autonomous of the others and width and length dimensions as well as material selection may vary between each level.

Once drip pan sheet 50 is cut to the desired length (e.g., partial or complete length of AGL frame 10), drip pan 50 may be formed directly/indirectly in relation to AGL frame 10. Drip pan 50 may be formed using a jig (e.g., a drip pan jig) which at least partially aligns and restrains drip pan 50 in relation to AGL frame 10. In one embodiment, drip pan 50 is fixed at least partially to AGL frame 10 such that drip pan 50 is at least partially suspended above cross members 14. Fixing drip pan 50 to AGL frame 10 further defines a pan depth which is at least partially defined by the distance between the concave edges and the center of drip pan 50.

As depicted in FIGS. 4A-4C, drip pan jig 100 may include two components, frame bracket 102 and clamp bracket 150. FIG. 4A depicts drip pan jig 100 in the closed position and FIG. 4B depicts drip pan jig 100 in the partially rotated position. Frame bracket 102 may be configured and dimensioned to interface with clamp bracket 150. Particularly, clamp bracket 150 may be releasably connected with frame bracket 102. More particularly, clamp bracket 150 may be hingedly connected with frame bracket 102, such that frame bracket 102 and clamp bracket 150 may rotate in relation to a fixed point. Even more particularly, frame bracket 102 and clamp bracket 150 may be hingedly connected by hinge pin 152. FIG. 4C depicts the full rotation of clamp bracket 150 in relation to frame bracket 102. To restrict hinge pin 152 from sliding out, clasp 154 may be connected with hinge pin 152. Clasp 154 may be tethered by a chain to any one of frame bracket 102 or clamp bracket 150 to ensure clasp 154 remains with drip pan jig 100 throughout drip pan jig 100 use, storage and/or transport. Explanation of drip pan jig 100 is better explained in further view of FIGS. 5A-6, which depict frame bracket 102 and clamp bracket 150 in more detail. The use of any orientation labels (e.g., side, back or front) are not intended to be limiting, but rather to provide descriptors for ease of explanation.

As depicted in FIGS. 5A-5B in view of FIG. 4C, frame bracket 102 includes first U-shaped cavity 104, which is defined by sidewalls 106 and first back wall 108. Extending from first back wall 108, perpendicular to first U-shaped cavity 104, is second U-shaped cavity 110, which is defined by first back wall 108, sidewall 112, and second back wall 114. First U-shaped cavity 104 is configured and dimensioned to interface with clamp bracket 150, such that clamp bracket 150 at least partially fits within first U-shaped cavity 104. As stated above, frame bracket 102 and clamp bracket 150 may be hingedly connected by hinge pin 152. Hinge pin 152 may be introduced into hole 116, which extends between sidewalls 106. Second U-shaped cavity 110 is configured and dimensioned to interface with AGL frame (not shown). Particularly, second U-shaped cavity 110 may be configured and dimensioned to interface with vertical member (not shown). The distance between first back wall 108 and sidewall 112 may be substantially similar to the outside dimension of vertical member (not shown). In some embodiments, vertical member 12 may have a square cross-section.

Frame bracket 102 may further include at least one interface element to engage with any one of clamp bracket 150, AGL frame (not shown), rail (not shown), drip pan sheet (not shown) and any combination thereof. For example, frame bracket 102 may include hook 118, which at least partially defines hook cavity 120. Hook 118 may interface with clamp bracket 150, as will be discussed in more detail below. Frame bracket 102 may further include AGL interface element 122. Particularly, AGL interface element 122 may interface with vertical member (not shown). More particularly, AGL interface element 122 may be a threaded fastener that extends at least partially into second U-shaped cavity 110. Frame bracket 102 may further include drip pan interface element 124. Drip pan interface element 124 may be a threaded fastener. Each of the above mentioned interface elements will be discussed in more detail below.

As depicted in FIGS. 6A-6B, clamp bracket 150 includes sidewalls 156 and front wall 158. The use of any orientation labels (e.g., side, back or front) are not intended to be limiting, but rather to provide descriptors for ease of explanation. Extending between sidewalls 156 is hole 160, which interfaces with hinge pin (not shown), as discussed above in relation to frame bracket 102. Clamp bracket 150 may be configured and dimensioned to semi-permanently interface with at least one portion of frame bracket 102. In one embodiment, clamp bracket 150 may include lever assembly (e.g., toggle assembly) 162 and U-bar 164. U-bar 164 may be positioned in close proximity to lever assembly 162 such that U-bar 164 moves at least partially in relation to the movement of lever assembly 162. U-bar 164 extends at least partially beyond front wall 158. U-bar 164 interfaces with hook 118 to semi-permanently connect clamp bracket 150 to frame bracket 102, as will be discussed in more detail below. Although depicted as lever assembly 162, U-bar 164 and hook 118, other forms of locking mechanisms may be utilized. For example, a bolt on one bracket (e.g., frame bracket or clamp bracket) that interfaces with a threaded plate located on the other bracket (e.g., clamp bracket or frame bracket), that when tightened, draws frame bracket 102 and clamp bracket 150 together. Other locking mechanisms will be apparent to one skilled in the art.

Clamp bracket 150 may further include cam assembly 170, which may include cam arm 172 and cam ledge 174. Cam assembly 170 may be configured and dimensioned to interface at least partially with drip pan rail (not shown). Cam arm 172 may be hingedly connected with clamp bracket 150. For example, pin 176 may rotationally connect cam arm 172 to clamp bracket 150 to promote rotational movement in relation to cam ledge 174. Cam arm 172 may further include distinct contact points 178 that interface with drip pan rail (not shown). Cam ledge 174 may include surface 180 where drip pan rail (not shown) may rest. Cam arm 172 may further include cam interface element 182 to interface at least partially with cam ledge 174. Particularly, cam fastener 182 may interface with cam ledge 174 such that tightening cam fastener 182 causes at least one contact point 178 to rotate closer to cam ledge 174. Each of the above distinct features will be discussed in more detail below.

As previously stated, drip pan sheet 50 may be unfurled within AGL frame 10 until drip pan sheet 50 extends the desired length (e.g., partial or full length of AGL frame 10). In most instances, the width of drip pan sheet 50 will be wider than the width opening of AGL frame 10, which is at least partially defined by cross member 14. In such instances, the edge of drip pan sheet 50 may be curled away from the respective cross member 14 so as to shape drip pan sheet 50 into having a concave cross-section (See FIG. 3). At least a portion of the curled drip pan sheet 50 will be in close proximity to AGL frame 10. More particularly, at least a portion of the curled drip pan sheet 50 may be in contact with vertical members 12. At least a portion of drip pan sheet 50 may be temporarily in contact with cross member 14 (e.g., during installation), which, as stated above, may produce irreversible deformation to drip pan sheet 50 if left for an extended period of time. In such case, drip pan sheet 50 should be suspended above the respective cross member(s) 14 (i.e., cross member(s) 14 directly beneath drip pan sheet 50). Suspension of drip pan sheet 50 may at least partially be accomplished through the use of drip pan jig 100.

The following description focuses on the complete installation of a single drip pan jig 100, unless otherwise stated. Therefore, it is anticipated that multiple drip pan jigs 100 may be installed. Accordingly, the following installation is not intended to be limiting to installing a single drip pan jig 100 at a time. To disassemble frame bracket 102 from clamp bracket 150, in the event the brackets were stored assembled, any one of the following disassembly techniques may assist in disassembly. Disassembly may include moving lever assembly 162 to disengage U-bar 164 from hook 118 and/or removal of clasp 154 from hinge pin 152 and then removing hinge pin 152 from holes 116, 160. Disengagement of U-bar 164 from hook 118 enables free rotation of frame bracket 102 and clamp bracket 150 in relation to hinge pin 152. Removal of hinge pin 152 from holes 116, 160 enables the complete separation of frame bracket 102 from clamp bracket 150. The above process may be utilized in reverse to assemble drip pan jig 100, if, for instance, assembly is desired for storage.

Beginning with one vertical member 12, vertical member 12 may for example be located at one of the ends of AGL frame 10, position frame bracket 102 with respect to vertical member 12. Specifically, orient frame bracket 102 such that the end with hole 116 is opposite drip pan sheet 50. Position frame bracket 102 such that the opening to first U-shaped cavity 104 is directed towards the opposing vertical member 12. It should be noted that opposing vertical members 12 are those vertical members 12 located on the other side of drip pan 50. Position second U-shaped cavity around vertical member 12, ensuring second back wall 114 is in contact with vertical member 12. Position frame bracket 102 such that edge 103 is in close proximity with edge 19 of LED rail mounting bracket 16. Particularly, position frame bracket 102 such that edge 103 is in contact with edge 19 of LED rail mounting bracket 16. Once frame bracket 102 is in the desired position, engage AGL interface element 122, as shown in FIG. 7. In one instance, AGL interface element 122 is a fastener that engages with vertical member 12. However, additional interface elements are anticipated.

Once frame bracket 102 is tightened against vertical member 12, as discussed above, position drip pan sheet 50 until the edge of drip pan sheet 50 is in close proximity to frame bracket 102. Specifically, pull drip pan sheet 50 towards the base of frame bracket 102 until the edge of drip pan sheet 50 is in contact with edge 109 of first back wall 108, as shown in FIG. 8. In one embodiment, pliers may be used to pull drip pan sheet 50 towards edge 109 of frame bracket 102. Since frame bracket 102 is pressed against LED rail mounting bracket 16, the dimension of drip pan sheet 50 is consistent at each vertical member 12. Once the edge of drip pan sheet 50 is pressed against edge 109, engage drip pan interface element 124. In one instance, drip pan interface element 124 may be a fastener, however, additional interface elements are anticipated. Since drip pan sheet 50 may be easily damaged by a small or pointed fastener, drip pan interface element 124 may have a rounded tip to ensure drip pan interface element 124 does not damage drip pan sheet 50. In either case, drip pan interface element 124 grips drip pan sheet 50 such that drip pan sheet 50 is at least partially in contact with edge 109.

Engage clamp bracket 150 with frame bracket 102, as discussed above (See FIGS. 4A-4C and 9). Specifically, position clamp bracket 150 at least partially within first U-shaped cavity 104 of frame bracket 102. At least partially align hole 160 of clamp bracket 150 with hole 116 of frame bracket 102, such that hole 160 and hole 116 are sufficiently aligned to accept hinge pin 152. Hinge pin 152 hingedly interfaces frame bracket 102 with clamp bracket 150 such that clamp bracket 150 may at least partially rotate in relation to frame bracket 102. Clasp 154 may be positioned on hinge pin 152 to ensure hinge pin 152 does not slide out of holes 116, 160.

In one embodiment, as mentioned above, the installation of frame bracket 102 with drip pan sheet 50 and clamp bracket 150, as explained throughout, may be accomplished individually on a single vertical member 12. In another embodiment, at least two installations may be accomplished simultaneously. Such installations may occur on adjacent vertical members 12 and/or opposite vertical members 12.

Drip pan rail 184 may be positioned in close proximity to drip pan sheet 50. Particularly, drip pan rail 184 may be at least partially in contact with drip pan sheet 50. Drip pan rail 184 may extend between at least two AGL frame sets 11. In one embodiment, a plurality of drip pan rails 184 may be positioned to extend at least a portion of the length of AGL frame 10. The plurality of drip pan rails 184 may be positioned in at least partial contact with the curled portion of drip pan sheet 50 along at least a portion of the length of AGL frame 10. The plurality of drip pan rails 184 may interface with adjacent drip pan rails 184. Drip pan rail 184 may be fabricated from a material displaying sufficient structural properties to at least partially constrain drip pan sheet 50 upon removal of drip pan jig 100 (e.g., metal, plastic, wood). Drip pan rail 184 may be an angled bracket (e.g., 90 degree bracket) or a substantially flat bracket. Drip pan rail 184 may further include a plurality of holes (or other attachment features) to engage with drip pan sheet 50. In one embodiment, drip pan rail 184 includes a plurality of holes (not shown) for receipt of at least one fastener (See FIGS. 12 and 13). The plurality of holes (not shown) may be predrilled or may be drilled after installation of drip pan rail 184, as discussed below.

Drip pan jig 100 (e.g., clamp bracket 150) may be configured and dimensioned to interface with drip pan rail 184. Particularly, cam assembly 170 of clamp bracket 150 may be configured and dimensioned to interface with drip pan rail 184. In one embodiment, drip pan rail 184 may be positioned on cam ledge 174 such that at least one surface of drip pan rail 184 is at least partially in contact with drip pan sheet 50. More particularly, angled drip pan rail 184 (e.g., 90 degree angle), having a horizontal surface and a vertical surface, may be positioned on cam ledge 174 such that the horizontal surface is in at least partial contact with cam ledge 174 (e.g., surface 180) and the vertical surface is in at least partial contact with drip pan sheet 50, as depicted in FIGS. 10A and 10B. Note, in FIG. 10B, frame bracket 102 was removed for clarity.

Cam arm 172, which may be hingedly attached to clamp bracket 150, may be positioned such that a portion of cam arm 172 is in close proximity to the horizontal portion of angled drip pan rail 184 and a portion of cam arm 172 is in close proximity to the vertical portion of angled drip pan rail 184. Cam arm 172 may be rotated in relation to cam ledge 174. Cam arm 172, as stated above, may include at least one contact point 178 for interfacing with drip pan rail 184. Particularly, cam arm 172 includes a plurality of contact points 178 for interfacing with angled drip pan rail 184. Even more particularly, cam arm 172 may include at least two contact points 178. The at least two contact points 178 together interface with horizontal and vertical portions of angled drip pan rail 184 so as to ensure localized contact with drip pan rail 184 (See FIGS. 10A-10B). Once drip pan rail 184 is in the desired position in relation to drip pan sheet 50, cam arm 172 may apply pressure to drip pan rail 184, by way of contact points 178, to at least partially restrict movement of drip pan rail 184. Particularly, cam interface element 182 may be engaged so as to rotate cam arm 172 such that contact points 178 constrain drip pan rail 184 against at least one of cam ledge 174 and drip pan sheet 50. Even more particularly, cam interface element 182 (e.g., threaded fastener), which is positioned relative to cam arm 172, may be engaged against a portion of cam ledge 174 such that cam arm 172 forcibly rotates thereby forcing contact points 178 against drip pan rail 184, which causes drip pan rail 184 to be pressed against at least one of cam ledge 174 and drip pan sheet 50.

Clamp bracket 150 may be configured and dimensioned to semi-permanently interface with at least one portion of frame bracket 102. After securing drip pan rail 184, clamp bracket 150 may be semi-permanently attached to frame bracket 102. Semi-permanent attachment of drip pan jig 100 may be accomplished systematically, wherein a portion of drip pan jigs 100 are simultaneously semi-permanently attached. For example, on a given level of AGL frame 10, all adjacent drip pan jigs 100 may be semi-permanently attached. Semi-permanent attachment of drip pan jig 100 may also be accomplished individually, wherein each drip pan jig 100 is semi-permanently attached separately. The semi-permanent attachment procedure depends on a variety of factors, including size of drip pan sheet 50 and AGL frame 10, quantity and position of drip pan jigs 100, material of drip pan sheet 50 and/or drip pan rail 184, among others.

In one embodiment, as depicted in FIGS. 11A-11B, clamp bracket 150 may include lever assembly (e.g., toggle assembly) 162 and U-bar 164. U-bar 164 may be positioned in close proximity to lever assembly 162 such that U-bar 164 moves at least partially in relation to the movement of lever assembly 162. U-bar 164 extends at least partially beyond front wall 158. U-bar 164 is configured and dimensioned to interface with hook 118 of frame bracket 102. Particularly, U-bar 164 is configured and dimensioned to interface with hook 118 to semi-permanently connect clamp bracket 150 to frame bracket 102.

In operation, adjustment of lever assembly 162 simultaneously adjusts the position of U-bar 164. For example, adjustment of lever assembly 162 may rotate U-bar 164 away from or closer to hook 118. Therefore, adjust lever assembly 162 such that U-bar 164 is in close proximity to hook 118. Particularly, adjust lever assembly 162 until U-bar 164 is in close proximity to hook cavity (hidden). Once U-bar 164 is in close proximity to hook cavity (hidden) of hook 118, adjust lever assembly 162 so as to cause U-bar 164 to pull closer to front wall 158. In doing so, U-bar 164 will engage with hook 118, thereby semi-permanently attaching clamp bracket 150 to frame bracket 102. As shown in FIG. 11B, U-bar 164 will at least partially fill hook cavity (hidden) of hook 118 such that U-bar 164 can no longer rotate. Clamp bracket 150 and frame bracket 102 should fit snuggly and there should be minimal (if any) rotational movement between the brackets. Rotational movement between clamp bracket 150 and frame bracket 102, as discussed above, is evident of improper U-bar 164 attachment, as will be understood by someone skilled in the art. Engagement of frame bracket 102 and clamp bracket 150 thereby semi-permanently constrains drip pan sheet 50 and drip pan rail 184 to AGL frame 10 (e.g., vertical member 12).

Although depicted as lever assembly 162, U-bar 164 and hook 118, other forms of locking mechanisms may be utilized. For example, the use of a fastener and cooperating attachment element (e.g., fastener and threaded nut), wherein frame bracket 102 and clamp bracket 150 include corresponding attachment elements.

For extended use, it is desired to at least semi-permanently constrain drip pan rail 184 to drip pan sheet 50 without the use of drip pan jig 100. It is also desired to at least semi permanently constrain drip pan rail 184 and drip pan sheet 50 to AGL frame 10 without the use of drip pan jig 100. Furthermore, at least semi-permanently constraining any one of drip pan rail 184 and drip pan sheet 50 to AGL frame 10 without the use of drip pan jig 100. Semi-permanent (or permanent) attachment (e.g., interface feature 186) may include the use of fasteners (e.g., nuts and bolts, rivets, pins, screws, wire), integral joints (e.g., seams, crimps, snap-fits), adhesives, adhesive fasteners and any combination thereof. A plurality of semi-permanent (or permanent) attachment features, strategically positioned and in close proximity to drip pan rail 184, drip pan sheet 50 and AGL frame 10, may be used.

In one embodiment, upon engagement of drip pan sheet 50 and drip pan rail 184 to AGL frame 10 using drip pan jig 100, as described above, a plurality of semi-permanent (or permanent) elements may interface with drip pan rail 184 and drip pan sheet 50. Particularly, drip pan sheet 50 and drip pan rail 184 may be semi-permanently (or permanently) attached by interface element 186. In some embodiments, as shown in FIG. 12, interface element 186 may interface with drip pan rail 184, drip pan sheet 50 and AGL frame 10. Particularly, vertical member 12 of AGL frame 10. Interface element 186 may be a fastener (e.g., nut and bolt). In some instances, cam interface element 182 may be partially loosened to allow for refinement of drip pan rail 184 and insertion of interface element 186.

As depicted in FIG. 13, a plurality of holes 56 may be positioned along drip pan rail 184 and drip pan sheet 50 between vertical members 12. The disclosed holes enable additional attachment between drip pan sheet 50 and drip pan rail 184 between vertical members 12. In some instances, holes 56 may be pre-drilled or may be drilled once assembled. In other instances, holes 56 may be pre-drilled into drip pan rail 184 and may be drilled upon assembly into drip pan sheet 50, thereby ensuring hole alignment. Although depicted as 5 holes 56 between vertical members 12, the number of holes 56 depends on a variety of factors, including the distance between vertical members 12, the anticipated weight of drip pan sheet 50 with the desired contents, and the type of interface elements 186 utilized.

Upon at least semi-permanent attachment of drip pan rail 184 and drip pan sheet 50, as described above, drip pan jig 100 may be uninstalled. For example, by using the above instructions in reverse. Particularly, disengage cam insertion element 182 from cam assembly 170, doing so will release the pressure on drip pan rail 184. Disengage U-bar 164 from hook 118 by moving lever assembly 162 accordingly. Upon doing so, clamp bracket 150 may freely rotate around hinge pin 152. Remove clasp 154 from hinge pin 152 and disengage hinge pin 152 from hole 116, 160, ensuring clamp bracket 150 does not fall. Next, disengage drip pan interface element 124, doing so will release the pressure on drip pan sheet 50. Lastly, disengage AGL interface element 122, doing so will release the pressure on AGL frame 10 (e.g., vertical member 12), ensuring frame bracket 102 does not fall. However, it is expected that disassembly may not exactly follow the above instructions.

In one embodiment, the disassembly of drip pan jig 100, as explained throughout, may be accomplished individually for each vertical member 12. In another embodiment, at least two drip pan jigs 100 may be disassembled together. Such disassembly may occur on adjacent vertical members 12 and/or opposite vertical members 12.

FIG. 14 depicts a semi-permanently (or permanently) attached drip pan sheet 50, drip pan rail 184 and vertical member 12, notably without drip pan jig 100. Particularly, at least drip pan sheet 50 and drip pan rail 184 may be attached by interface element 186. In some instances, as described above, drip pan sheet 50 and drip pan rail 184 and vertical member 12 may be attached by interface element 186. As previously stated, drip pan sheet 50 may further include barrier (e.g., end cap) 58 which may facilitate fluid flow down a closely positioned drain 60 or, if no drain or the drain is closed, cap 58 may enable drip pan 50 to act as a holding chamber.

The installation procedure, as described above, may be modified without affecting the purpose of drip pan jigs 100, which is to semi-permanently constrain drip pan sheet 50 and drip pan rail 184 to the AGL frame 10 to ensure consistent semi-permanent (or permanent) engagement between drip pan sheet 50 and drip pan rail 184 and, in some instances, vertical member 12.

The following clauses further define particular aspects and embodiments of the present disclosure.

Clause 1. A method of installing a pan within a frame including unfurling the pan at least partially within the frame, wherein the unfurled pan defines a concave shape and extends at least partially the length of the frame; engaging at least one pan jig with the unfurled pan and the frame; detachably attaching the unfurled pan relative to the frame using a semi-permanent attachment element; and disengaging the at least one pan jig from the unfurled pan and the frame, wherein upon disengagement of the at least one pan jig, the unfurled pan maintains attachment relative to the frame.

Clause 2. The method of clause 1 further including positioning a pan rail relative to the unfurled pan and the frame after engaging the at least one pan jig with the unfurled pan and the frame.

Clause 3. The method as in any one of clauses 1-2 wherein the frame includes at least one vertical member and at least one cross member positioned relative to the at least one vertical member, and wherein the pan jig engages the unfurled pan and the at least one vertical member.

Clause 4. The method as in any one of clauses 1-3 wherein the frame defines a length, and wherein the unfurled pan continuously extends the length of the frame.

Clause 5. The method as in any one of clauses 1-4 wherein the pan is fabricated from a material selected from the group consisting of plastic, sheet metal, canvas and combinations thereof.

Clause 6. A pan jig including a frame bracket defining (i) a first U-shaped cavity configured and dimensioned to at least partially receive a clamp bracket, and (ii) a second U-shaped cavity in proximity to the first U-shaped cavity, said frame bracket including a first engagement member; and a clamp bracket hingedly connected relative to the first U-shaped cavity of the frame bracket and including a second engagement member, wherein the second engagement member of the clamp bracket is configured and dimensioned to semi-permanently lock with the first engagement member of the frame bracket.

Clause 7. The pan jig of clause 6 wherein the frame bracket is configured and dimensioned to receive a pan.

Clause 8. The pan jig as in any one of clauses 6-7 wherein alignment functionality is provided, at least in part, by the frame bracket governing (i) the height of the pan above a pan rail, (ii) the position of the pan relative to the frame, and (iii) the vertical alignment of a pan rail hole to a frame hole.

Clause 9. The pan jig as in any one of clauses 6-8 wherein the second U-shaped cavity is configured and dimensioned to receive a vertical member of the frame.

Clause 10. The pan jig as in any one of clauses 6-9 wherein the clamp bracket further includes a cam assembly which is configured and dimensioned to receive a pan rail.

Clause 11. The pan jig as in any one of clauses 6-10 wherein the first engagement member is a hook and the second engagement member is a lever assembly and a U-bar, wherein the U-bar is configured and dimensioned to engage the hook, and wherein the lever assembly is configured and dimensioned to semi-permanently lock the U-bar with the hook.

Clause 12. A method of forming and mounting a pan including unfurling the pan at least in part within a frame, wherein the unfurled pan defines a concave shape and extends at least partially the length of the frame; mounting a frame bracket to the frame, wherein the frame bracket is configured and dimensioned to receive at least a portion of the unfurled pan; mounting a clamp bracket relative to the frame bracket, wherein the clamp bracket includes a cam assembly which is configured and dimensioned to receive a pan rail; positioning a pan rail relative to the cam assembly, wherein the pan rail is simultaneously in contact with the pan; semi-permanently locking the clamp bracket, the pan rail and the unfurled pan relative to the frame bracket; fastening the pan rail and the unfurled pan to the frame; and removing the clamp bracket and the frame bracket, wherein upon removal of the clamp bracket and the frame bracket, the unfurled pan and the pan rail remain fastened relative to the frame.

Clause 13. The method of clause 12 wherein alignment functionality is provided, at least in part, by the frame bracket governing (i) the height of the pan above the pan rail, (ii) the position of the pan relative to the frame, and (iii) the vertical alignment of a pan rail hole to a frame hole.

Clause 14. The method as in any one of clauses 12-13 wherein the frame further includes at least one vertical member and at least one cross member positioned relative to the at least one vertical member, wherein the frame bracket is positioned relative to the vertical member.

Clause 15. The method as in any one of clauses 12-14 wherein the frame defines a plurality of levels.

Clause 16. The method as in any one of clauses 12-15 wherein an unfurled pan is associated with each of the plurality of levels.

Clause 17. The method as in any one of clauses 12-16 further including fastening the pan rail to the unfurled pan at a plurality of positions within the frame.

Clause 18. The method as in any one of clauses 12-17 wherein the pan is fabricated from a material selected from the group consisting of plastic, sheet metal, canvas and combinations thereof.

Clause 19. The method as in any one of clauses 12-18 wherein semi-permanently locking the clamp bracket, the pan rail and the pan with the frame bracket restricts movement of the pan rail and the unfurled pan.

Clause 20. The method as in any one of clauses 12-19 wherein the unfurled pan continuously extends the length of the frame.

Approximating language, as used herein throughout the specification and claims, may be applied to modify any quantitative or qualitative representation that could permissibly vary without resulting in a change in the basic function to which it is related. Accordingly, a value modified by a term such as "about" or numerical ranges is not to be limited to a specified precise value, and may include values that differ from the specified value. In at least some instances, the approximating language may correspond to the precision of an instrument for measuring the value.

It will be apparent to those skilled in the art that various modifications and variations can be made in the method and system of the present disclosure without departing from the spirit or scope of the disclosure. Thus, it is intended that the present disclosure include modifications and variations that are within the scope of the appended claims and their equivalents.

While the disclosure has been described in detail in connection with only a limited number of aspects and embodiments, it should be understood that the disclosure is not limited to such aspects. Rather, the disclosure can be modified to incorporate any number of variations, alterations, substitutions, or equivalent arrangements not heretofore described, but which are commensurate with the scope of the claims. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The invention claimed is:

1. A method of installing a pan within a frame, the method comprising:
   a. unfurling the pan at least partially within the frame, wherein the unfurled pan defines a concave shape and extends at least partially the length of the frame;
   b. engaging at least one pan jig with the unfurled pan and the frame;
   c. detachably attaching the unfurled pan relative to the frame using a semi-permanent attachment element; and
   d. disengaging the at least one pan jig from the unfurled pan and the frame,
   wherein upon disengagement of the at least one pan jig, the unfurled pan maintains attachment relative to the frame;
   wherein the at least one pan jig comprises:
      a frame bracket defining (i) a first U-shaped cavity configured and dimensioned to at least partially receive a clamp bracket, and (ii) a second U-shaped cavity in proximity to the first U-shaped cavity, said frame bracket including a first engagement member; and the clamp bracket hingedly connected relative to the first U-shaped cavity of the frame bracket and including a second engagement member; and wherein:

the second engagement member of the clamp bracket is configured and dimensioned to semi-permanently lock with the first engagement member of the frame bracket;

the first engagement member is a hook and the second engagement member is a lever assembly and a U-bar;

the U-bar is configured and dimensioned to engage the hook; and the lever assembly is configured and dimensioned to semi-permanently lock the U-bar with the hook.

2. The method according to claim 1, further comprising positioning a pan rail relative to the unfurled pan and the frame after engaging the at least one pan jig with the unfurled pan and the frame.

3. The method according to claim 1, wherein the frame comprises at least one vertical member and at least one cross member positioned relative to the at least one vertical member, and wherein the pan jig engages the unfurled pan and the at least one vertical member.

4. The method according to claim 1, wherein the frame defines a length, and wherein the unfurled pan continuously extends the length of the frame.

5. The method according to claim 1, wherein the pan is fabricated from a material selected from the group consisting of plastic, sheet metal, canvas and combinations thereof.

6. A pan jig comprising:
 a. a frame bracket defining (i) a first U-shaped cavity configured and dimensioned to at least partially receive a clamp bracket, and (ii) a second U-shaped cavity in proximity to the first U-shaped cavity, said frame bracket including a first engagement member; and
 b. the clamp bracket hingedly connected relative to the first U-shaped cavity of the frame bracket and including a second engagement member,
 wherein the second engagement member of the clamp bracket is configured and dimensioned to semi-permanently lock with the first engagement member of the frame bracket; and
 wherein:
  the first engagement member is a hook and the second engagement member is a lever assembly and a U-bar;
  the U-bar is configured and dimensioned to engage the hook; and
  the lever assembly is configured and dimensioned to semi-permanently lock the U-bar with the hook.

7. The pan jig of claim 6, wherein the frame bracket is configured and dimensioned to receive a pan.

8. The pan jig of claim 7, wherein alignment functionality is provided, at least in part, by the frame bracket governing (i) a height of the pan above a pan rail, (ii) a position of the pan relative to a frame, and (iii) a vertical alignment of a pan rail hole to a frame hole.

9. The pan jig of claim 6, wherein the second U-shaped cavity is configured and dimensioned to receive a vertical member of a frame.

10. The pan jig of claim 6, wherein the clamp bracket further comprises a cam assembly which is configured and dimensioned to receive a pan rail.

11. A method of forming and mounting a pan, the method comprising:
 a. unfurling the pan at least in part within a frame, wherein the unfurled pan defines a concave shape and extends at least partially the length of the frame;
 b. mounting a frame bracket of a pan jig to the frame, wherein the frame bracket is configured and dimensioned to receive at least a portion of the unfurled pan;
 c. mounting a clamp bracket of the pan jig relative to the frame bracket, wherein the clamp bracket comprises a cam assembly which is configured and dimensioned to receive a pan rail;
 d. positioning a pan rail relative to the cam assembly, wherein the pan rail is simultaneously in contact with the pan;
 e. semi-permanently locking the clamp bracket, the pan rail and the unfurled pan relative to the frame bracket;
 f. fastening the pan rail and the unfurled pan to the frame; and
 g. removing the clamp bracket and the frame bracket,
 wherein upon removal of the clamp bracket and the frame bracket, the unfurled pan and the pan rail remain fastened relative to the frame;
 wherein the pan jig comprises:
  the frame bracket defining (i) a first U-shaped cavity configured and dimensioned to at least partially receive the clamp bracket, and (ii) a second U-shaped cavity in proximity to the first U-shaped cavity, said frame bracket including a first engagement member; and
  the clamp bracket hingedly connected relative to the first U-shaped cavity of the frame bracket and including a second engagement member; and
 wherein:
  the second engagement member of the clamp bracket is configured and dimensioned to semi-permanently lock with the first engagement member of the frame bracket;
  the first engagement member is a hook and the second engagement member is a lever assembly and a U-bar;
  the U-bar is configured and dimensioned to engage the hook; and
  the lever assembly is configured and dimensioned to semi-permanently lock the U-bar with the hook.

12. The method according to claim 11, wherein alignment functionality is provided, at least in part, by the frame bracket governing (i) the height of the pan above the pan rail, (ii) the position of the pan relative to the frame, and (iii) the vertical alignment of a pan rail hole to a frame hole.

13. The method according to claim 11, wherein the frame further comprises at least one vertical member and at least one cross member positioned relative to the at least one vertical member, wherein the frame bracket is positioned relative to the vertical member.

14. The method according to claim 13, wherein the frame defines a plurality of levels.

15. The method according to claim 14, wherein an unfurled pan is associated with each of the plurality of levels.

16. The method according to claim 11, further comprising fastening the pan rail to the unfurled pan at a plurality of positions within the frame.

17. The method according to claim 11, wherein the pan is fabricated from a material selected from the group consisting of plastic, sheet metal, canvas and combinations thereof.

18. The method according to claim 11, wherein semi-permanently locking the clamp bracket, the pan rail and the pan with the frame bracket restricts movement of the pan rail and the unfurled pan.

19. The method according to claim 11, wherein the unfurled pan continuously extends the length of the frame.

\* \* \* \* \*